INVENTOR:
CARL M. HARRINGTON,
BY David Young
ATT'Y.

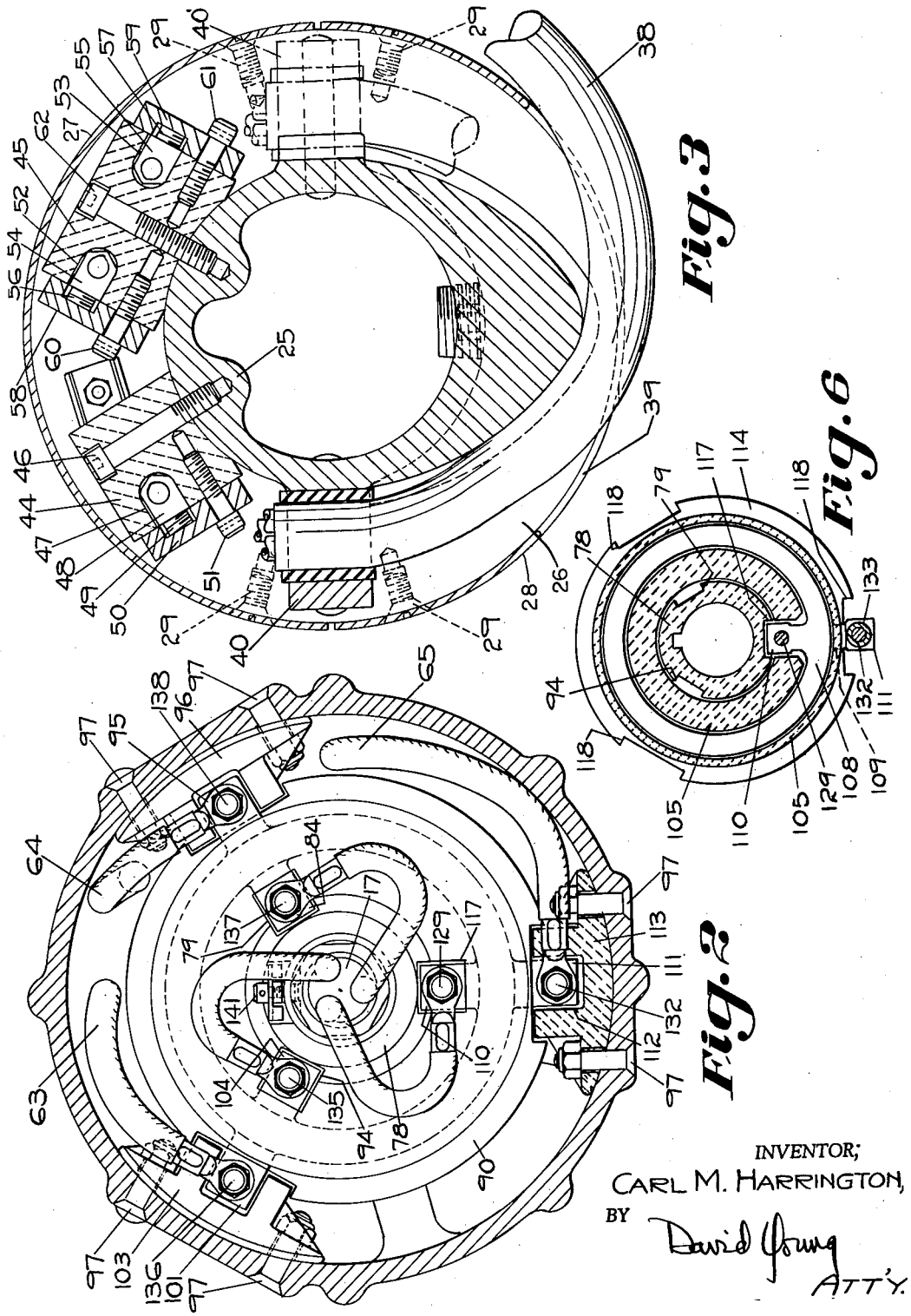

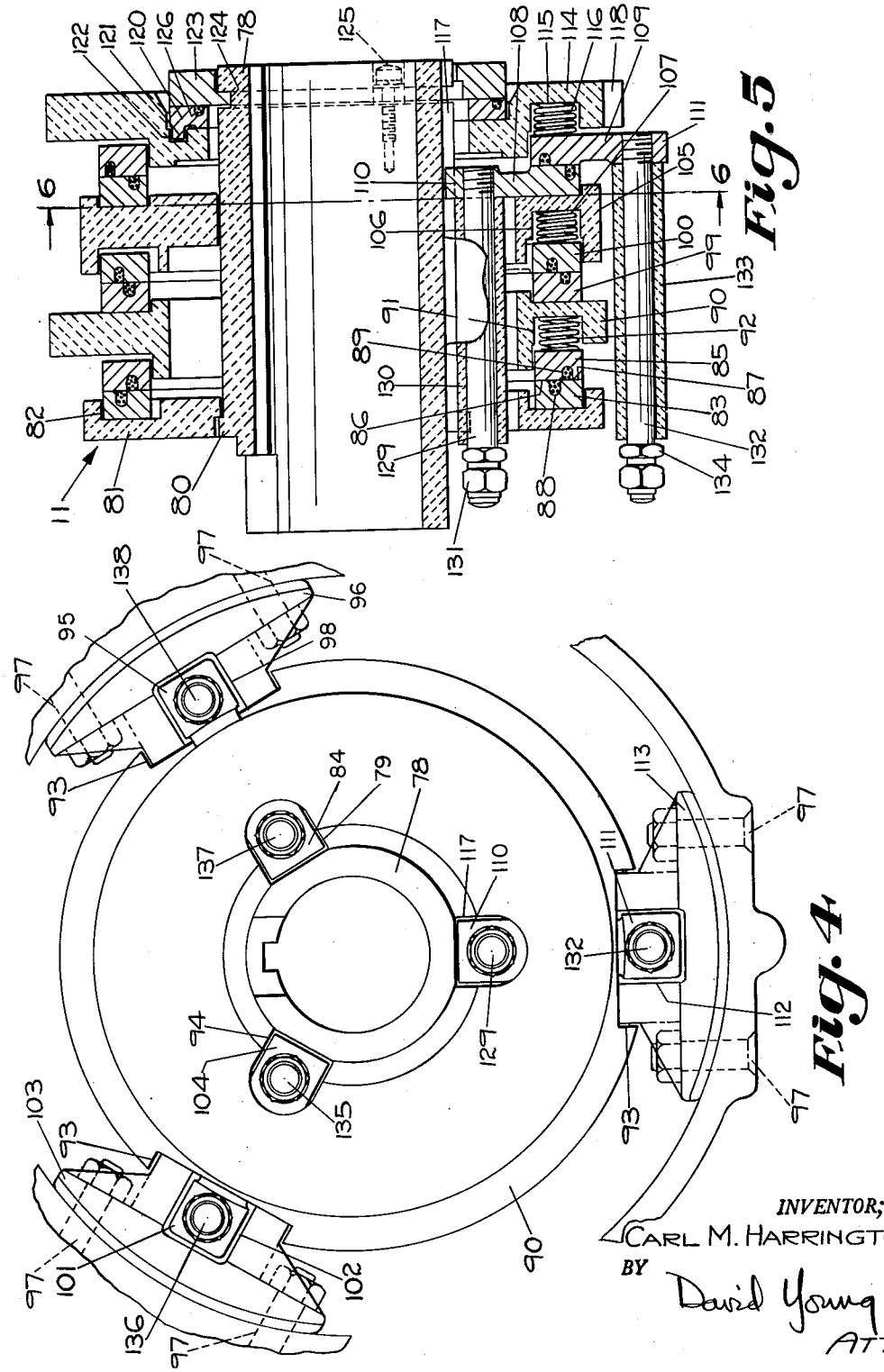

United States Patent Office 3,032,616
Patented May 1, 1962

3,032,616
CURRENT COLLECTOR MEANS
Carl M. Harrington, Columbus, Ohio, assignor, by mesne assignments, to Jeffrey Galion Manufacturing Company, a corporation of Ohio
Filed May 20, 1959, Ser. No. 814,533
6 Claims. (Cl. 191—12.2)

The instant invention relates to current collector means for a cable reel in which a length of conductor cable is wound on or unwound from the cable reel, with the current collector means operating to conduct current from the cable on the cable reel to a lead cable as the cable is either unwound from or wound on the cable reel.

It is an object of the instant invention to provide an improved current collector means for conducting current from a conductor cable carried on a rotatable cable reel to a lead cable held against rotation relative thereto.

It is a further object of the instant invention to provide an improved current collector means comprising relatively rotatable current collector elements for conducting current to a fixed lead cable from a conductor cable that rotates relatively to the lead cable in which the current collecting elements have contact with each other over substantially a complete circle and in which they are held in contacting relation while being free to move limited amounts by not being rigidly attached to their supporting means.

It is another object of the instant invention to provide an improved current collector means which is formed as a unitary assembly by cooperating rotary and non-rotary collecting rings that may be mounted or removed as a unit on a supporting structure.

Still another object of the instant invention is to provide an improved current collector means comprising current collector rings disposed in abutting contacting relation to each other, and in which one of the current collector rings is held against rotation while otherwise being free for limited movement and the other of the current collector rings is rotatable relatively to the fixed current collector ring, with each of the current collector rings including terminal means projecting radially therefrom in opposite directions for connection of a fixed lead cable to the terminal means of the fixed current collector ring, and for the connection of a rotating conductor cable to the terminal means of the rotating current collector ring.

It is a still further object of the instant invention to provide a cable reel for winding and unwinding a cable, including the improved current collector means of the instant invention.

Other objects of the invention will appear hereinafter, the novel features and combinations being set forth in the appended claims.

In the accompanying drawings:

FIG. 2 is a sectional view of the cable reel, taken on the line 2—2 of FIG. 1;

FIG. 3 is a sectional view of the cable reel, taken on the line 3—3 in FIG. 1;

FIG. 4 is a partial end end view in elevation of the cable reel;

FIG. 5 is a sectional view of the improved current collector means showing it as a unitary assembly; and FIG. 6 is a sectional view taken on the line 6—6 of FIG. 5 and looking in the direction of the arrows.

Figure 1:
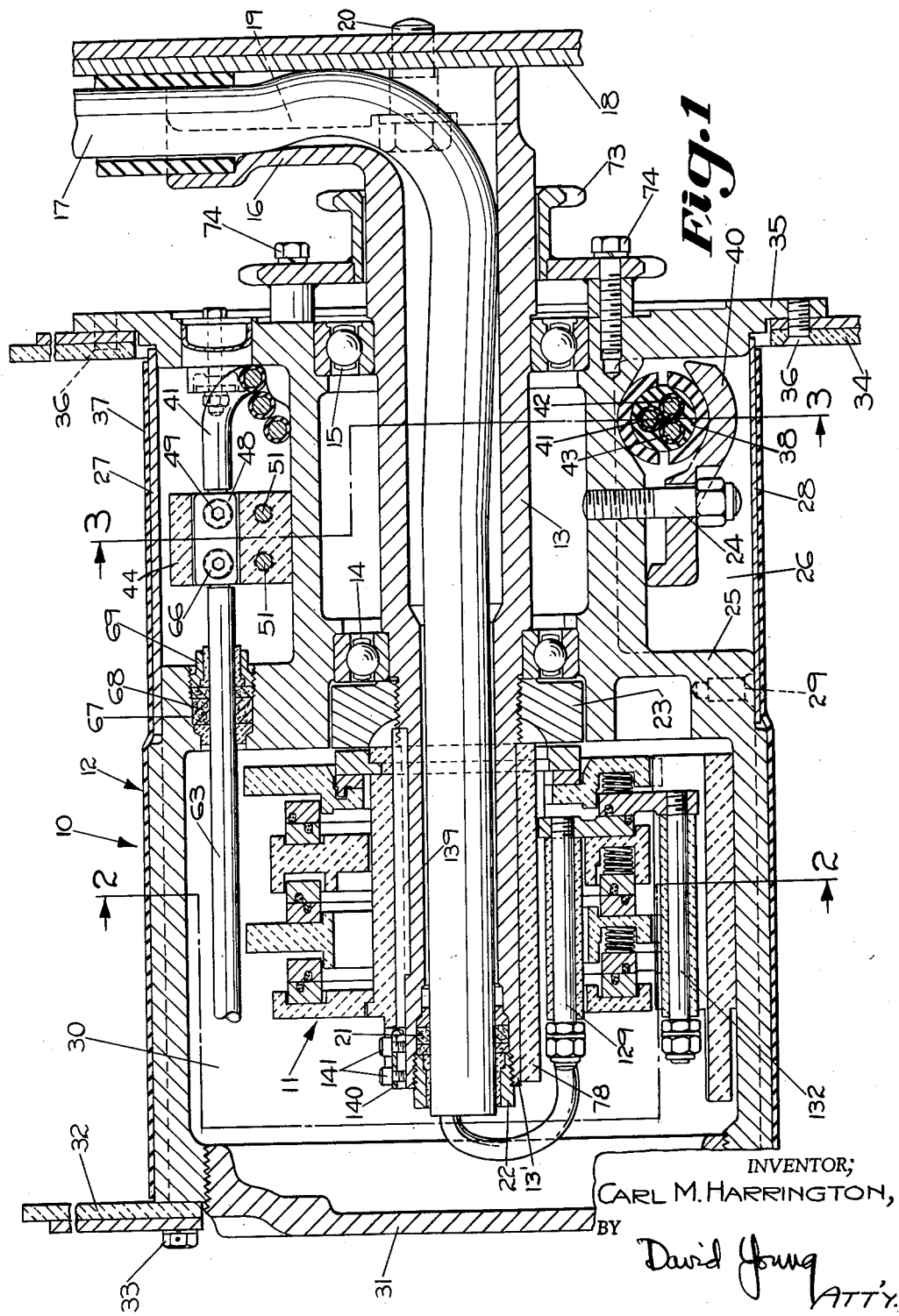
FIG. 1 is a sectional view of the cable reel including the improved current collector means of the instant invention.

The instant invention relates to current collector means for cable reels, in which the cable reel is used for winding and unwinding a length of conductor cable, with the current collector means being embodied in the structure of the cable reel to conduct current from the moving conductor cable on the cable reel to a fixed lead cable. The cable reel may be utilized in electrically powered mobile equipment, such as mining machines. In these machines the source of electrical power is located at a fixed position in the mine, and the mobile machine includes as a part of its equipment the cable reel on which there is wound a substantial length of conductor cable which is connected to the fixed source of electrical power. The current is conducted to the machine through the conductor cable, and as the machine is driven away from the fixed source of electrical power, the conductor cable unwinds from the cable reel. As the mobile machine returns towards the fixed source of electrical power, the conductor cable is wound on the cable reel, such winding and unwinding of the conductor cable being timed to correspond to the rate of travel of the mobile machine.

The mobile electrically powered machine further includes a fixed lead cable, and there is provided the current collector means of this invention, which is interposed between the conductor cable and the lead cable, for conducting current from the moving conductor cable to the fixed lead cable. The current collector means comprises rotating and non-rotating current collector rings. The conductor cable, which is moving with the cable reel as it winds and unwinds, is connected to the terminal means of the rotating current collector rings, and the fixed lead cable is connected to the terminal means of the non-rotating current collector rings, whereby the current is conducted by the current collector rings from the conductor cable to the lead cable to power the electrical equipment of the mobile machine.

Referring to the drawings, there is illustrated therein a cable reel 10, which includes the improved current collector means 11 of the instant invention. The cable reel 10 comprises a substantially cylindrical cable drum 12, which is rotatably supported on a fixed or non-rotary shaft 13 by means of suitable antifriction bearing means 14, 15. The shaft 13 is hollow and includes a laterally extending hollow leg 16 through which a three conductor lead cable 17 extends. The hollow shaft 13 is secured to the frame 18 of the machine of which the cable reel 10 is a part. The hollow leg 16 is formed with flanges 19 on the opposite sides thereof, through which bolts 20 are threaded into the frame 18 for securing the shaft 13 to the machine. The shaft 13 thus forms a support for the cable reel 10.

The lead cable 17 extends from the electrical equipment of the machine through the hollow leg 16 and through the hollow shaft 13, terminating at the outer end 13' of the shaft 13. The open end of the lead cable 17 is surrounded by packing and insulation 21 at the outer end 13' of the shaft 13, and is held in place by a clamping nut 22, which includes insulation surrounding the lead cable 17, and is threaded into the outer end 13' of the shaft 13 to compress the packing and insulation 21 around the end of the lead cable 17. The three conductors of said lead cable extend from the open end thereof and are provided with terminals (see FIG. 2) for connection as hereinafter described.

The cylindrical cable drum 12 includes a drum frame 25, which is rotatably supported on the shaft 13 by the anti-friction bearings 14, 15, and is locked on the shaft 13 by the retaining nut 23 which is threaded on the shaft 13. The drum frame 25 is formed at its inner end with a chamber 26 that is closed by a connector cover plate 27 and a cable cover plate 28, as seen in FIGS. 1 and 3. Each of the cover plates 27, 28 extends through an arc of approximately 180 degrees, and is secured to the drum frame 25 by a plurality of cap screws 29.

The drum frame 25 includes a housing 30 for the current collector means 11, which is disposed axially beyond the chamber 26, at the outer end of the drum frame 25. The housing 30 is closed by a threaded end cap 31, which is threaded into the outer end of the drum frame 25, and thereby locked to seal the outer end of the housing 30. At the outer end of the cable drum 12 there is provided an annular end wall 32 of substantial radial dimension, which is secured to the drum frame 25 by a plurality of bolts 33. At the inner end of the cable drum 12 there is provided a similar annular end wall 34 of substantial radial dimension, which is secured by a plurality of bolts 36 to an annular flange 35 formed integrally with the drum frame 25. The cable drum 12 is wrapped with a neoprene sleeve 37, and is adapted to receive a conductor cable 38, which is wound on the cable drum 12 between the end walls 32, 34 for storage, and is unwound therefrom as the machine moves away from the fixed source of electrical power to which the conductor cable 38 is connected.

The cable cover plate 28 is formed with a circumferentially extending slot 39 (see FIG. 3) adjacent the inner end wall 34, and the conductor cable 38 is led into the chamber 26 from the periphery of the cable drum 12 through the slot 39. In the chamber 26 there is provided a cable clamp 40 secured to the drum frame 25 by a stud and nut 24. The conductor cable 38 passes between the cable clamp 40 and the drum frame 25 and is clamped against the drum frame 25 by force applied to the cable clamp 40 through the stud and nut 24. As seen in FIG. 3 in broken lines, there is provision for a cable clamp 40' on the side of the drum frame 25 opposite that on which the cable clamp 40 is disposed, and the selection of the position for the cable clamp 40 on the one or the other side of the drum frame 25 will depend on the direction in which the conductor cable 38 is led into the chamber 26. The conductor cable 38 includes three individual electrical conductors 41, 42, 43, which are led around the drum frame 25 to connector mounting blocks 44, 45, as best seen in FIGS. 1 and 3.

The connector mounting block 44 is secured to the drum frame 25 by a cap screw 46, and is provided with a cavity 47 within which there is disposed an electrical connector 48. The conductor 41 is received by the electrical connector 48, and is secured thereto in contacting engagement therewith by the stud 49. A connector locking plate 50 overlies the electrical connector 48 to lock it in the cavity 47, and the locking plate 50 is secured to the connector mounting block 44 by a cap screw 51.

The connector mounting block 45 is similar to the connector mounting block 44, with the exception that it is a double connector mounting block, with two oppositely disposed cavities 52, 53 for the reception of electrical connectors 54, 55, respectively. The conductors 42, 43 are connected to the electrical connectors 54, 55, respectively, and are secured thereto in contacting engagement therewith by studs 56, 57, respectively. A locking plate 58, 59 in provided for each side of the double connector mounting block 45 for securing the electrical connectors 54, 55, respectively, in place, and the locking plates 58, 59 are secured to the connector mounting block 45 by cap screws 60, 61, respectively. The double connector mounting block 45 is secured to the drum frame 25 by a cap screw 62.

At the opposite side of the connector mounting blocks 44, 45 there are provided three lead conductors 63, 64, 65. The lead conductor 63 is connected to the electrical connector 48 by stud 66, and thereby forms an extension of the conductor 41. Each of the other lead conductors 64, 65 is similarly connected to the electrical connectors 54, 55 thereby forming extensions of conductors 42, 43, respectively. Each of the lead conductors 63, 64, 65 is led into the current collector means housing 30 through individual openings 67 in the drum frame 25. Each opening 67 is provided with suitable insulation and packing 68 interposed between the lead conductors 63, 64, 65 and the drum frame 25. The insulation and packing 68 is secured in the opening 67 by an insulated clamping nut 69 that is threaded into the opening 67.

The cylindrical cable drum 12, including the conductor cable 38, is rotatable on the shaft 13, being supported thereon by the bearings 14, 15. The cable drum 12 is locked on the shaft 13 by a retaining nut 23 that is threaded on the shaft 13 and abuts the bearing 14. The inner end of the cable drum 12 includes a sprocket 73 secured to the inner end of the drum frame 25 by a plurality of bolts 74. The sprocket 73 is connected by suitable chain drive means (not illustrated) to the propelling mechanism for the machine of which the cable reel 10 is a part. The rotation of the cable drum 12 is thereby timed in accordance with the movement of the machine, whereby the conductor cable 38 is unwound from the cable drum 12 at the same rate as the rate of movement of the machine away from the source of electrical power to which the conductor cable 38 is connected. When the machine returns towards the source of electrical power, the cable drum 12 is similarly driven through the sprocket 73 to wind the conductor cable 38 on the cable drum 12 at the same rate as the rate of speed of the machine in returning towards the source of electrical power. Accordingly, there is never any excess length of conductor cable 38 trailing the machine on the ground, which could possibly cause entanglement of the conductor cable 38 and possible damage thereto, or to other equipment in the area.

In the housing 30 there is mounted the current collector means 11 by which the conductor cable 38 is connected to the lead cable 17 for providing electrical power to the electrically powered operating devices or mechanisms of the machine. The current collector means 11 is constructed as a unitary assembly and is illustrated as such in FIG. 5.

The current collector means comprises a tubular spindle insulation sleeve 78 (see FIG. 5) which is adapted to fit over the outer end of the shaft 13. The sleeve 78 is formed with three axially extending peripheral slots 79, 94, 117, which are equidistantly spaced around the periphery of the sleeve 78 and which extend the full length thereof, except that the portion thereof at the outer end (left end as viewed in FIG. 5) is of reduced diameter from flange 80 to the left. Near its outer end, and to the right (FIG. 5) of the mentioned portion of reduced outside diameter the sleeve is formed with a flange 80. An outer stationary insulation ring or disc 81 is disposed on the sleeve 78, and abuts the flange 80, whereby the outer insulation ring is retained on the sleeve 78. The outer insulation ring 81 has an inwardly facing annular seat 82 in which there is received an outer stationary current collector ring 83 which surrounds the sleeve 78. The current collector ring 83 includes an integral terminal support and connector 84, which projects radially inwardly from the current collector ring 83, and is disposed within the axially extending peripheral slot 79 of the spindle insulation sleeve 78, whereby the current collector ring 83 is held stationary relatively to the sleeve 78.

Adjacent the stationary current collector ring 83 there is disposed another rotating current collector ring 85 which abuts the current collector ring 83 and is of the same size and surrounds sleeve 78. Each of the current collector rings 83, 85 is formed with a bearing or contacting face 86, 87, respectively, of the same area and which bear on each other, whereby the current collector rings 83, 85 are in contacting engagement with each other to transmit current between them over the complete circumference of each, or, in other words, through 360 degrees. Each current collector ring 83, 85 includes a circular, non-concentrically disposed groove 88, 89, respectively, formed in the bearing faces 86, 87, respectively. Each of the grooves 88, 89 is filled with a mixture of graphite and lubricant for lubrication of the bearing faces 86, 87 as the current collector ring 85 rotates relatively to the current collector ring 83. The collector rings are of equal diameter and their contacting faces are in a plane generally at right angles to the axis of rotation of collector ring 85 and cable drum 12. As hereinafter set forth this plane of contact is not rigidly fixed. An intermediate rotating insulation ring 90 is disposed adjacent the rotating current collector ring 85. The insulation ring 90 includes three axially extending sockets 91 facing the rotating current collector ring 85 and equidistantly spaced around the insulation ring 90. Within each socket 91 there is disposed a compression spring 92, the force of which is applied between the insulation ring 90 and the rotating current collector ring 85, to urge the latter against the stationary current collector ring 83.

The current collector ring 85 is formed with an integral terminal support and connector 95, which projects radially outwardly from the current collector ring 85, in the opposite direction from the terminal support and connector 84 of the current collector ring 83. Within the housing 30 of the cable drum 12, there is provided an outer guide insulation block 96 secured to the cable drum 12 within the housing 30 by a plurality of cap screws and nuts 97. The outer guide insulation block 96 is formed with an axially extending slot 98 which is adapted loosely to receive the terminal support and connector 95 with its sides contacting said connector 95 for rotating the current collector ring 85 as the cable drum 12 rotates on the shaft 13 while providing for limited relative movement therewith. The rotating intermediate insulation ring 90 is formed with three peripheral recesses 93 that are mated with the outer guide insulation blocks 96, 103, 113, whereby the rotating intermediate insulation ring 90 is rotated with the cable drum 12.

At the inner side of the intermediate rotating insulation ring 90 there is disposed an intermediate pair of current collector rings comprising an intermediate rotating current collector ring 99 and an intermediate stationary current collector ring 100. The intermediate rotating current collector ring 99 includes a terminal support and connector 101 projecting radially outwardly from the current collector ring 99, and engaged loosely by the sides of the axially extending slot 102 of the outer guide insulation block 103 for rotating the current collector ring 99 without it being rigidly attached thereto. The intermediate stationary current collector ring 100 comprises a terminal support and connector 104, projecting radially inwardly from the current collector ring 100 in the opposite direction from the terminal support and connector 101 of the current collector ring 99. The terminal support and collector 104 is loosely engaged between the sides of an axially extending slot 94 of the spindle insulation sleeve 78, whereby the current collector ring 100 is held stationary against rotation without being rigidly attached to the sleeve. It will be understood that the construction of the current collector rings 99, 100 is the same in all respects as the current collector ring 85, 83, respectively.

Adjacent the stationary current collector ring 100 there is disposed an intermediate stationary insulation ring 105, which is formed with three sockets 106, in each of which there is disposed a compression spring 107 that exerts its force between the insulation ring 105 and the stationary current collector ring 100, to urge the latter into contacting engagement with the rotating current collector ring 99. The sockets 106 are axially extending, and equidistantly spaced around the insulation ring 105.

Beyond the stationary intermediate insulation ring 105 there is disposed an inner pair of current collector rings comprising an inner stationary current collector ring 108 and an inner rotating current collector ring 109 constructed similarly to the current collector rings 83, 85, respectively. The current collector ring 108 comprises a terminal support and connector 110 which projects radially inwardly from the current collector ring 108 and is loosely engaged with the sides of an axially extending slot 117 of the spindle insulation sleeve 78 for loosely holding the current collector ring 108 stationary. The inner rotating current collector ring 109 includes a terminal support and connector 111 projecting radially outwardly from the current collector ring 109 in the opposite direction from the terminal support and connector 110. The terminal support and connector 111 is loosely disposed in the slot 112 of the outer guide insulation block 113, whereby the current collector ring 109 is rotated with the cable drum 12. Beyond the current collector ring 109 there is disposed an inner rotating insulation ring 114 which is formed with three axially extending sockets 115, equidistantly spaced around the insulation ring 114 and facing the current collector ring 109. In each of the sockets 115 there is disposed a compression spring 116 which exerts its force between the current collector ring 109 and the insulation ring 114 to urge the current collector ring 109 into contacting engagement with the current collector ring 108. The inner rotating insulation ring 114 includes three peripheral recesses 118 that mate with the outer guide insulation blocks 96, 103, 113, whereby the insulation ring 114 is rotated with the cable drum 12.

A thrust ring 120 is disposed beyond the insulation ring 114 abutting the latter, and including an ear 121 which engages the insulation ring 114 in a socket 122 for rotation of the thrust ring 120 with the insulation ring 114. Beyond the thrust ring 120 there is provided a locking ring 123 which is engaged with the spindle insulation sleeve 78 in the peripheral slot 124 and serves to hold all the previously described elements of the current collector means 11 in assembly on the spindle insulation sleeve 78. A cap screw 125 is threaded through the locking ring 123 into the spindle insulation sleeve 78 for fixedly securing the locking ring 123 to the spindle insulation sleeve 78, whereby the locking ring 123 is fixed relatively to the thrust ring 120, which latter rotates with the rotating insulation ring 114. The thrust ring 120 and locking ring 123 bear against each other, and the former includes an annular slot 126, non-concentrically disposed in the face thereof, which is filled with a mixture of graphite and lubricant for lubricating the bearing surfaces of the thrust ring 120 and the locking ring 123.

A terminal post 129 is threadedly secured to the terminal support and connector 110 of the current collector ring 108 and extends in an axial direction towards the outer side of the current collecting means 11, the outer side of the current collecting means 11 being that closest to the end cap 31. A tubular insulation sleeve 130 surrounds the terminal post 129. The outer end of the terminal post 129 is provided with suitable nuts 131 for the connection of one of the conductors extending from the free end of lead cable 17 to the terminal end of the terminal post 129. A terminal post 132 is threaded into the terminal support and connector 111 and also extends axially therefrom towards the outer side of the current collecting means 11, and has a tubular insulation sleeve 133 surrounding the same. Suitable nuts 134 are secured to the terminal end of the terminal post 132 for the connection thereof of conductor 65 (see FIG. 2).

A second pair of terminal posts 135, 136 is threadedly secured to the terminal supports and connectors 104, 101, respectively, and a third pair of terminal posts 137, 138 is threadedly secured to the terminal supports and connectors 84, 95, respectively for connections to conductors, as illustrated in FIG. 2. It will be understood that the three pairs of terminal posts hereinbefore described are all identical in construction with the sole exception being as to the difference in length of the respective terminal posts, the length thereof being determined in accordance with the axial position of the terminal support and connector to which the terminal post is threadedly secured. The lengths of the several terminal posts are such that the terminal ends thereof are disposed in a common plane at the outer side of the current collecting means 11.

The current collecting means 11, as hereinbefore described and as illustrated in FIG. 5, forms a unitary assembly and is mounted as such on the outer end of the shaft 13. A key 139 fits between the spindle insulation sleeve 78 and the shaft 13 for non-rotatably securing the spindle insulation sleeve 78 to the shaft 13. The current collecting means 11 is locked on the end of the shaft 13 by a locking clip 140 and a pair of cap screws 141.

The current collector means of this invention is constructed as a unitary assembly, which is adapted to be substantially completely assembled and then fitted over a supporting shaft to be supported thereby within the cable drum. Likewise it may be readily removed as a unit. The individual conductors of the conductor cable and of the lead cable are led to the outer end of the current collector means. Each of the terminal posts has its terminal end disposed in a substantially common plane at the outer end of the current collector means, whereby the individual conductors of the conductor cable and the lead cable are readily connected to the terminal posts. The construction of the current collector means in accordance with the instant invention greatly facilitates the assembly of the current collector means in the cable drum and the connection of the individual conductors to the several terminal posts of the current collecting means.

Referring more specifically to some of the important features of the unitary assembly of the current collecting means 11, it is important to note that it is built up (see FIG. 5) on the insulating sleeve 78. Near the left-hand end of this sleeve 78 is the end insulating ring or disc 81 which has a central cylindrical opening which slips over the outside of the sleeve 78. Due to the abutment 80 on sleeve 78 said disc 81 is held against movement to the left, as viewed in FIG. 5, beyond said abutment 80, but if everything else is removed it would be free to move to the right and thus slipped off of said sleeve 78. Near its right-hand end the sleeve 78 is provided with the insulating ring or disc 114 which is removably held in place by the thrust ring 120, locking ring 123, etc. It is to be noted that no attempt is made to attach either the ring or disc 81 or the ring or disc 114 rigidly to the sleeve 78. In fact, in operation disc 114 rotates relative to sleeve 78. These two rings or discs comprise the end members of the unitary assembly comprising the collecting means 11.

Positioned between these end rings or discs 81 and 114 are the three sets of collector rings 83, 85, 99, 100, and 108, 109, as well as the spacing insulating rings 90 and 105. The compression springs 92, 107 and 116 are also disposed between said end discs or rings 81, 114. A very important factor is that none of these collector rings is rigidly attached to the associated insulating ring or disc, and that the associated insulating discs (such as 90 and 105) are not rigidly attached to the sleeve 78 or, for that matter, to anything else. As a consequence of all this there is no necessity for extremely accurate machining and assembling of the parts because all of the parts in this assembly are free to move in limited amounts to adjust themselves so that the contacting surfaces of the cooperating collector rings, such as the contacting faces of the two collector rings 83 and 85, are in uniform contact over substantially the entire surfaces.

Within the realm of my invention, in certain aspects it would be entirely practical to attach the collector ring 83, for example, to the insulating ring or disc 81, so long as it was not rigidly attached to the sleeve 78, or, conceivably, the disc or ring 81 might be rigidly attached to the sleeve 78, with the collector ring 83 relatively free to move in the receiving groove 82 as it is in my device. In other words, in the last analysis the key question is whether or not one or preferably both of any pair of collector rings, such as 83 and 85, is free to move limited amounts, particularly with respect to a plane at right angles to the axis of rotation of the rotatable collector rings 85, 99 and 109. In other words, a little free wabble is provided in one or both of each pair of contacting collector rings (such as 83, 85), so that there is no requirement for complete accuracy of assembly of the collector and insulating rings and they are free to move limited amounts in practically all directions so as to provide good contact between the contacting surfaces of cooperating collector rings.

At the same time the non-rotary collector rings are held against rotation without being rigidly attached to anything. This is provided, of course, by the loose fitting between the supports and connectors, such as 84, 104 and 110, and the sides of the cooperating slots, such as 79, 94 and 117, of the insulating sleeve 78. Likewise, the rotary collector rings are mounted for rotation with the cable drum 12 without being rigidly attached to anything. This is provided, of course, by the loose fitting between supports and connectors, such as 95, 101 and 111, and the sides of the cooperating slots, such as 98, 102 and 112, of the insulating blocks 96, 103 and 113, respectively.

Obviously those skilled in the art may make various changes in the details and arrangement of parts without departing from the spirit and scope of the invention as defined by the claims hereto appended, and applicant therefore wishes not to be restricted to the precise construction herein disclosed.

Having thus described and shown an embodiment of the invention, what is desired to secure by Letters Patent of the United States is:

1. A cable reel comprising a rotatable cable drum for holding a length of cable wound thereon, a non-rotary shaft rotatably supporting said cable drum, unitary current collector means mounted on said shaft independently of said cable drum and removable from said shaft as a unit, said current collector means including a sleeve of insulating material mounted directly on said shaft and held against rotation relative thereto, a pair of end discs of insulating material on said sleeve near opposite ends thereof, cooperating first and second collector rings surrounding said sleeve and positioned between said end discs and having contacting surfaces, spring means pressing said contacting surfaces into contact, means mounting said collector rings whereby one of them is held against rotation and the other is connected to rotate with said cable drum, said drums connecting means providing an interlocking but non-rigid connection to the ring connected to it which also provides for free removal of said unitary current collector from said cable drum without disturbing the unitary character of the current collector, said mounting means for said collector rings also providing for limited freedom of movement of at least one of said collector rings relative to any other parts of said unitary current collector while insuring contact between the contacting surfaces of said cooperating collector rings.

2. A cable reel comprising a rotatable cable drum for holding a length of cable wound thereon, a non-rotary shaft rotatably supporting said cable drum, unitary current collector means mounted on said shaft independently of said cable drum and removable from said shaft as a unit, said current collector means including a sleeve of insulating material mounted directly on said shaft and held against rotation relative thereto, a pair of end discs of insulating material on said sleeve near opposite ends thereof, cooperating first and second collector rings surrounding said sleeve and positioned between said end discs and having contacting surfaces, spring means pressing said contacting surfaces in contact, means mounting said collector rings whereby one of them is held against rotation and the other ring is connected to rotate with said cable drum, said drum connecting means providing an interlocking but non-rigid connection to the ring connected to it which also provides for free removal of said unitary current collector from said cable drum without disturbing the unitary character of the current collector, said mounting means for said collector rings also providing for limited freedom of movement of both of said collector rings relative to said sleeve and said drum while insuring contact between the contacting surfaces of said cooperating collector rings, said means for connecting said other ring to said drum including radially outwardly projecting terminal means on said other ring and an insulating block on said drum having a slot into which said terminal projects.

3. A cable reel comprising a rotatable cable drum for holding a length of cable wound thereon, a non-rotary shaft rotatably supporting said cable drum, unitary current collector means mounted on said shaft independently of said cable drum and removable from said shaft as a unit, said current collector means including a sleeve of insulating material mounted directly on said shaft and held against rotation relative thereto, a pair of end discs of insulating material on said sleeve near opposite ends thereof, cooperating first and second collector rings surrounding said sleeve end and positioned between said end discs and having contacting surfaces, spring means pressing said contacting surfaces into contact, means mounting said collector rings whereby one of them is held against rotation and the other ring is connected to rotate with said cable drum, said drum connecting means providing an interlocking but non-rigid connection to the ring connected to it which also provides for free removal of said unitary current collector from said cable drum without disturbing the unitary character of the current collector, said mounting means for said collector rings also providing for limited freedom of movement of both of said collector rings relative to said sleeve and said drum while insuring contact between the contacting surfaces of said cooperating collector rings, and said means for holding said one ring against rotation includes a radially inwardly projecting terminal means on said one ring extending into a slot of said insulating sleeve, said unitary collector means also including a terminal post secured to said terminal means and extending axially along and outside said insulating sleeve and outwardly beyond the adjacent end disc on said insulating sleeve whereby a conductor of a lead cable may be connected to said terminal post.

4. A cable reel comprising a rotatable cable drum for holding a length of cable wound thereon, a non-rotary shaft rotatably supporting said cable drum, unitary current collector means mounted on said shaft independently of said cable drum and removable from said shaft as a unit, said current collector means including a sleeve of insulating material mounted directly on said shaft and held against rotation relative thereto, a pair of end discs of insulating material on said sleeve near opposite ends thereof, cooperating first and second collector rings surrounding said sleeve and positioned between said end discs and having contacting surfaces, spring means pressing said contacting surfaces into contact, means mounting said collector rings whereby one of them is held against rotation and the other ring is connected to rotate with said cable drum, siad drum connecting means providing an interlocking but non-rigid connection to the ring connected to it which also provides for free removal of said unitary current collector from said cable drum without disturbing the unitary character of the current collector, said mounting means for said collector rings also providing for limited freedom of movement of both of said collector rings relative to said sleeve and said drum while insuring contact between the contacting surfaces of said cooperating collector rings, and said means for holding said one ring against rotation includes a radially inwardly projecting terminal means on said one ring extending into a slot of said insulating sleeve.

5. A cable reel comprising a rotatable cable drum for holding a length of cable wound thereon, a non-rotary shaft rotatably supporting said cable drum, unitary current collector means mounted on said shaft independently of said cable drum and removable from said shaft as a unit, said current collector means including a sleeve of insulating material mounted on said shaft and held against rotation relative thereto, cooperating first and second collector rings surrounding said sleeve and having contacting surfaces contacting in a plane generally at right angles to the axis of rotation of said cable drum and extending through substantially the entire circumference of booth of said rings, spring means pressing said contacting surfaces into contact, means mounting said collector rings whereby one of them is held against rotation and the other ring is connected to rotate with said cable drum, said drum connecting means providing an interlocking but non-rigid connection to the ring connected to it which also provides for free removal of said unitary current collector from said cable drum without disturbing the unitary character of the current collector, said mounting means for said collector rings also providing for limited freedom of movement of at least one of said collector rings relative to any other parts of said unitary current collector while insuring contact between the contacting surfaces of said cooperating collector rings.

6. A cable reel comprising a rotatable cable drum for holding a length of cable wound thereon, a non-rotary shaft rotatably supporting said cable drum, unitary current collector means mounted on said shaft independently of said cable drum and removable from said shaft as a unit, said current collector means including a sleeve of insulating material mounted on said shaft and held against rotation relative thereto, cooperating first and second collector rings surrounding said sleeve and having contacting surfaces contacting in a plane generally at right angles to the axis of rotation of said cable drum and extending through substantially the entire circumference of both of said rings, means pressing said contacting surfaces into contact, means mounting said collector rings whereby one of them is held against rotation and the other ring is connected to rotate with said cable drum, said mounting means for said collector rings providing for limited freedom of movement of at least one of said collector rings relative to any other parts of said unitary current collector while insuring contact between the contacting surfaces of said cooperating collector rings.

References Cited in the file of this patent

UNITED STATES PATENTS

| 1,123,602 | Sessions | Jan. 5, 1915 |
| 1,166,753 | Finizio | Jan. 4, 1916 |
| 1,596,557 | Scholes | Aug. 17, 1926 |
| 2,138,631 | Gardella | Nov. 29, 1938 |
| 2,325,805 | Shoffner | Aug. 3, 1943 |
| 2,387,556 | Baunach | Oct. 23, 1945 |
| 2,612,569 | Moon | Sept. 30, 1952 |
| 2,774,898 | LeTourneau | Dec. 18, 1956 |
| 2,832,056 | Stutzman | Apr. 22, 1958 |

OTHER REFERENCES

German printed application, Papst, German application Serial No. P3950, printed December 20, 1956 (KHOZK-), 3 pp. spec., 1 sht. dwg., class 310, subclass 232.